United States Patent [19]

Nakayama et al.

[11] Patent Number: 4,749,608
[45] Date of Patent: Jun. 7, 1988

[54] MAGNETIC RECORDING MEDIUM

[75] Inventors: Masatoshi Nakayama; Yasufumi Takasugi; Kunihiro Ueda, all of Nagano, Japan

[73] Assignee: TDK Corporation, Tokyo, Japan

[21] Appl. No.: 41,340

[22] Filed: Apr. 22, 1987

Related U.S. Application Data

[63] Continuation-in-part of Ser. No. 795,433, Nov. 6, 1985.

[30] Foreign Application Priority Data

| Nov. 9, 1984 | [JP] | Japan | 59-236155 |
| Nov. 12, 1984 | [JP] | Japan | 59-238082 |
| Nov. 13, 1984 | [JP] | Japan | 59-239249 |

[51] Int. Cl.⁴ .................................................. G11B 5/72
[52] U.S. Cl. ........................................ 428/216; 427/40; 427/41; 427/128; 427/131; 427/132; 427/44; 427/54.1; 428/336; 428/461; 428/463; 428/421; 428/422; 428/522; 428/694; 428/695; 428/900
[58] Field of Search ............. 428/694, 695, 900, 522, 428/421, 422, 216, 336, 461, 463, 469; 427/40, 41, 44, 129, 131, 132, 128, 54.1; 360/134–136

[56] References Cited

U.S. PATENT DOCUMENTS

| 4,368,239 | 1/1983 | Nakajima | 428/695 |
| 4,419,404 | 12/1983 | Arai | 427/41 |
| 4,429,024 | 1/1984 | Ueno | 427/41 |
| 4,565,734 | 1/1986 | Arai | 427/131 |
| 4,575,475 | 3/1986 | Nakayama | 427/40 |
| 4,582,746 | 4/1986 | Shirahata | 427/41 |
| 4,599,266 | 7/1986 | Nakayama | 427/131 |
| 4,601,950 | 7/1986 | Iida | 427/41 |
| 4,636,435 | 1/1987 | Yanagihara | 427/41 |
| 4,693,927 | 9/1987 | Nishikawa | 428/900 |
| 4,699,847 | 10/1987 | Nakayama | 428/900 |
| 4,711,809 | 12/1987 | Nishikawa | 428/900 |

FOREIGN PATENT DOCUMENTS 115232  6/1986  Japan .

Primary Examiner—Ellis P. Robinson
Attorney, Agent, or Firm—Oblon, Fisher, Spivak, McClelland & Maier

[57] ABSTRACT

A magnetic recording medium comprising a substrate, a ferromagnetic metal thin film on the substrate, and a topcoat on the thin film exhibits improved strength and durability when the topcoat is comprised of a plasma-polymerized film prepared by activating a gaseous hydrocarbon monomer or a mixture thereof with a carrier gas into a plasma under specific conditions. The plasma-polymerized film consists of carbon and hydrogen in an atomic ratio of C/H of from 1:1 to 6:1 and has a thickness of 3 to 15 Å and a contact angle with water in the range from 60° to 120°. An organic coating may be present on the plasma-polymerized film.

17 Claims, 1 Drawing Sheet

MAGNETIC RECORDING MEDIUM

This application is a continuation-in-part application of our copending application Ser. No. 795,433 filed Nov. 6, 1985 for Magnetic Recording Medium.

CROSS-REFERENCE TO THE RELATED APPLICATION

Reference is made to copending application Ser. No. 812,897 filed Dec. 23, 1985 for Magnetic Recording Medium, assigned to the same assignee as the present invention and incorporated herein by reference.

BACKGROUND OF THE INVENTION

This invention relates to magnetic recording media, and more particularly, to improvements in magnetic recording media having a magnetic layer of the continuous thin film type.

Among magnetic recording media for use in video, audio and other applications, active research and development work has been made on magnetic recording media, usually magnetic tapes having a magnetic layer in the form of a continuous thin film because of the compactness of a roll of tape.

The preferred magnetic layers for such continuous film type media are deposited films of Co, Co-Ni, Co-O, Co-Ni-O and similar systems formed by the so-called oblique incidence evaporation process in which cobalt and optional elements are evaporated and directed at a given angle with respect to the normal to the substrate because such evaporated films exhibit superior characteristics. The evaporated magnetic layers, however, have many disadvantages including high dynamic friction, low film strength, rough head contact, and low runnability (that is, the durability of tape which travels in frictional contact with rigid members in a video equipment) resulting in reduced output after repeated travels. In the case of video application, the evaporated magnetic layers exhibit a short life time when operated in the still mode (to be simply referred to as "still life", hereinafter). In addition, there occur many dropouts in such layers.

Under these circumstances, a variety of topcoats have heretofore been proposed which cover obliquely evaporated magnetic layers. Exemplary of the topcoat are coatings of plasma-polymerized hydrocarbons as disclosed in Japanese Patent Application Kokai Nos. 59-72653, 59-154641 and 59-160828 and U.S. Pat. No. 4,429,024. However, topcoats of plasma-polymerized hydrocarbons formed by the conventional methods are not fully satisfactory, exhibiting insufficient corrosion resistance, low runnability, diminishing reproduction output, and low strength.

SUMMARY OF THE INVENTION

It is an object of the present invention to provide an improved magnetic recording medium having very high corrosion resistance, runnability and strength.

The present invention is directed to a magnetic recording medium comprising a substrate, a ferromagnetic metal thin film formed on the substrate, and a topcoat formed on the thin film.

According to a first aspect of the present invention, the topcoat is comprised of a plasma-polymerized film prepared by activating a gaseous hydrocarbon monomer optionally containing an amount of a carrier gas to give a volume ratio of carrier to monomer of up to 1 into a plasma with the parameter W/F.M set to $10^8$ to $10^{10}$ joule/kg where W is an input power applied for plasma generation in joule/sec., F is a flow rate of the monomer in kg/sec., and M is the molecular weight of the monomer. The plasma-polymerized film consists essentially of carbon and hydrogen in an atomic ratio of carbon to hydrogen of from 1:1 to 6:1 and has a thickness of 3 to 15 angstroms and a contact angle with water in the range from 60° to 120°.

According to a second aspect of the present invention, the topcoat comprises a plasma-polymerized film and an organic coating applied thereon, the plasma-polymerized film being prepared by activating a gaseous hydrocarbon monomer optionally containing an amount of a carrier gas to give a volume ratio of carrier to monomer of up to 1 into a plasma with the parameter W/F.M set to $10^8$ to $10^{10}$ joule/kg where W is an input power applied for plasma generation in joule/sec., F is a flow rate of the monomer in kg/sec., and M is the molecular weight of the monomer, whereby the plasma-polymerized film consists essentially of carbon and hydrogen in an atomic ratio of carbon to hydrogen of from 1:1 to 6:1 and has a thickness of 3 to 15 angstroms and a contact angle with water in the range from 60° to 120°.

BRIEF DESCRIPTION OF THE DRAWINGS

The above and other objects, features, and advantages of the present invention will be better understood from the following description taken in conjunction with the accompanying drawings, in which.

the single FIGURE.

DETAILED DESCRIPTION OF THE INVENTION

Figure 1:
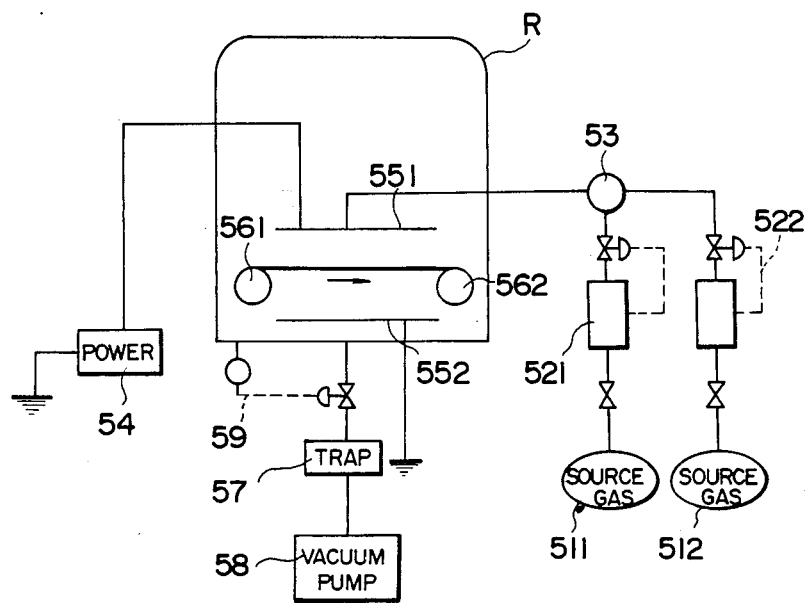
FIG. 1 is a schematic view of a plasma polymerizing apparatus.

The topcoat used in the magnetic recording medium of the present invention is comprised of a thin plasma-polymerized film consisting essentially of carbon and hydrogen.

The film is prepared by activating a gaseous monomeric reactant into a plasma for plasma polymerization. Exemplary of the gaseous monomers there may be given saturated and unsaturated hydrocarbons, for example, methane, ethane, propane, butane, pentane, ethylene, propylene, butene, butadiene, acetylene, methylacetylene, and the like and mixtures thereof. Preferably, they are gaseous at room temperature because of ease of operation. If desired, a hydrocarbon which is liquid at room temperature may be used as the reactant for plasma polymerization. The reactant may optionally contain a minor proportion of nitrogen, oxygen, boron, phosphorus, etc.

The plasma-polymerized film has a thickness of 3 to 15 Å, preferably 3 to 8 Å. In magnetic recording media of the continuous thin film type, as a plasma-polymerized film becomes thicker, particularly in excess of 40 Å, the spacing loss (magnetic loss due to thickness component) becomes too much and the magnetic flux density is lowered. The head gap is more frequently clogged and a considerable ouput reduction occurs after repeated passes. Even within the relatively reduced thickness range, thicknesses of more than 15 Å are less preferred because of increased dynamic friction, deteriorated jitter and envelope characteristics after durability test runs, and increased dropouts. It is supposed that when relatively thicker films are deposited under the plasma polymerizing conditions of the present process as will be later defined by W/F.M, carrier/monomer ratio and other parameters, the film stability is adversely affected. In contrast, films having a thickness of at most 15 Å, particularly at most 8 Å exhibit reduced dynamic friction, less deteriorated jitter and envelope characteristics after durability test runs, and reduced dropouts. For this reason, the upper limit of 15 Å, most preferably 8 Å is imposed on the thickness of the plasma-polymerized film.

Our copending application Ser. No. 812,897 assigned to the same assignee as the present invention discloses a comparative example in which a topcoat consists of a plasma-polymerized film of 5 Å thick and an organic film vacuum deposited thereon. This plasma-polymerized film is not formed under the plasma polymerizing conditions of the present process as will be later defined by parameter W/F.M, and the vacuum deposited film is present as an uppermost layer. This topcoat is insufficient in jitter and envelope characteristics, dropouts, and dynamic wear after durability test runs.

Thicknesses of less than 3 Å are too thin to provide corrosion resistance, runnability, and rupture strength.

Control of film thickness in forming a plasma-polymerized film may be done by a choice of reaction time, web moving speed, reactant gas flow rate and other factors. Control should be done so as to produce a megnetic recording medium having a reduced spacing loss, and high corrosion resistance, runnability, and film rupture strength.

The plasma-polymerized film is prepared by using the above-mentioned hydrocarbon as a gaseous monomeric reactant, creating a discharge plasma of the monomer, and contacting the plasma with the magnetic layer.

The gaseous monomer is activated into a plasma whereupon activated species of the monomer are polymerized and deposited on the magnetic layer to form a coherent, dense, mechanically and chemically stable film. Because of durability and corrosion resistance, the plasma-polymerized film can exert its full performance even at a reduced thickness as thin as 3 to 15 Å.

In contrast, Arai et al, U.S. Pat. No. 4,419,404, incorporated herein by reference, discloses a magnetic recording medium having a polymerized hydrocarbon film. The polymerization process disclosed therein depends on the plasma-induced polymerization wherein a carrier gas is activated into a plasma so that the monomer is polymerized and deposited with the aid of activated species of the carrier gas, rather than the exact plasma polymerization wherein a gaseous monomeric reactant itself is entirely activated into a plasma. It was found that films resulting from plasma-induced polymerization are somewhat poor in denseness and chemical and mechanical strengths, failing to achieve sufficient corrosion resistance and durability.

The principle of plasma treatment will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma. Since gaseous molecules have a less chance of collision with electrons and absorb little energy, they are kept at a tempeature approximate to room temperature. Such a system in which the kinetic energy (electron temperature) of electrons and the thermal motion (gas temperature) of molecules are not correlated is designated a low temperature plasma. In this system, chemical species set up the state capable of additive chemical reaction such as polymerization while being kept relatively unchanged from the original. The present invention utilizes this state to form a plasma-polymerized film on a substrate. The use of a low temperature plasma avoids any thermal influence on the substrate and the magnetic layer.

FIG. 1 illustrates a typical apparatus in which a plasma-polymerized film is formed on the surface of a substrate. This plasma apparatus uses a variable frequency power source. The apparatus comprises a reactor vessel R into which a gaseous reactant or reactants are introduced from a source 511 and/or 512 through a mass flow controller 521 and/or 522. When desired, different reactants from the sources 511 and 512 may be mixed in a mixer 53 to introduce a gas mixture into the reactor vessel. The gaseous reactants may be fed each at a flow rate of 1 to 250 ml per minute.

Disposed in the reactor vessel R is means for supporting the base web, in this embodiment, a set of supply and take-up rolls 561 and 562 on which the web is wound. Depending on the particular shape of the magnetic recording medium base web, any desired supporting means may be used, for example, a rotary support apparatus on which the substrate rests.

On the opposed sides of the web are located a pair of electrodes 551 and 552, one electrode 551 being connected to a variable frequency power source 54 and the other electrode 552 being grounded.

The reactor vessel R is further connected to a vacuum system for evacuating the vessel, including a liquefied nitrogen trap 57, an oil rotary vacuum pump 58, and a vacuum controller 59. The vacuum system has the capacity of evacuating and keeping the reactor vessel R at a vacuum of 0.01 to 10 Torr.

In operation, the reactor vessel R is first evacuated by means of the vacuum pump to a vacuum of $10^{-3}$ Torr or lower before a gaseous reactant or reactants are fed into the vessel at a predetermined flow rate. Then the interior of the reactor vessel is maintained at a vacuum of 0.01 to 10 Torr. A take-up roll motor (not shown) is turned on to transfer the substrate. When the flow rate of the gas mixture and the rate of transfer of the substrate become constant, the variable frequency power 54 is turned on to generate a plasma with which a plasma-polymerized film is deposited on the travelling substrate.

In the practice of the present invention, the gaseous monomer or monomers are directly exposed to a plasma atmosphere, that is, excited into a plasma.

It is generally known in the plasma polymerization technique to use a carrier gas in combination with a gaseous monomer. Arai et al, U.S. Pat. Nos. 4,419,404 and 4,565,734 use a carrier gas in a volume ratio of carrier gas to monomer gas of 1 or higher. The use of more than one part by volume of carrier gas per part by volume of monomer gas incurs etching of the polymerized deposit with the carrier gas during plasma polymerization, resulting in increased dynamic friction, deteriorated envelope and jitter characteristics, and increased dropouts. For this reason, the present invention uses the carrier gas in a volume ratio of carrier to monomer of up to unity. The carrier gas need not be used in the practice of the present invention. Therefore, in one preferred embodiment, no carrier gas is used and essentially the monomer gas alone is activated into a plasma. Essentially the monomer gas alone indicates a reduced volume ratio of carrier to monomer of 0.005 or lower. By exciting essentially the monomer gas alone into a plasma, there is obtained a polymerized film exhibiting remarkably improved jitter and envelope characteristics after durability test runs.

Japanese Patent Application Kokai No. 60-263311, which is incorporated herein by reference, describes a topcoat film prepared by exciting only a hydrocarbon gas into a plasma. However, films as thin as 3 to 15 Å are not described and no reference is made to the polymerizing parameter W/F.M.

According to the present invention, the carrier gas may be used in a less than unity volume ratio as described above. Illustrative of the carrier gases are argon (Ar), helium (He), nitrogen ($N_2$) and hydrogen ($H_2$).

The plasma-polymerized film is prepared by feeding a gaseous monomer into a plasma zone with W/F.M set to $10^8$ to $10^{10}$ joule/kg where W is an input power applied for plasma generation as expresed in joule/sec., F is a flow rate of the monomer as expresed in kg/sec., and M is the molecular weight of the monomer. If W/F.M is less than $10^7$, the resulting plasma-polymerized film is insufficiently dense to provide corrosion resistance. The substrate is severely damaged with W/F.M in excess of $10^{12}$. Even within the range, some problems are found in stable run, jitter and envelope characteristics, dynamic friction, and dropout. Thus, the parameter W/F.M in the range of $10^8$ to $10^{10}$ is necessary to fully improve these properties. It is to be noted that when the carrier gas is used in combination, its flow rate and molecular weight may be neglected in calculating the parameter W/F.M.

The remaining parameters such as applied current and operating time may be as usual and properly chosen without undue experimentation.

Plasma generation may be conducted by any suitable means such as microwave discharge, DC discharge and AC discharge as well as the above-mentioned high frequency discharge.

The thus formed plasma-polymerized film contains carbon and hydrogen in an atomic ratio of carbon to hydrogen (C/H) in the range of from 1:1 to 6:1. A plasma-polymerized film having such a C/H ratio exhibits outstandingly improved corrosion resistance and durability. C/H ratios of less than 1 provide films practically unacceptable in corrosion resistance, durability and strength. A substantial reduction in output occurs after repeated cycles at C/H ratios of higher than 6.

It should be noted that the C/H ratio may be determined by SIMS (secondary ion mass spectroscopy), for example. When SIMS is used, the C/H ratio of the present topcoat film having a thickness of 3 to 15 Å may be calculated by determining the counts of C and H at the topcoat film surface. Alternatively, the C/H ratio may be calculated by determining the profile of C and H while effecting ion etching with Ar or the like. The measurement of SIMS may be in accord with the article "SIMS and LAMMA" in the Surface Science Basic Lectures, Vol. 3, 1984, Elementary and Application of Surface Analysis, page 70.

The plasma-polymerized film should have a contact angle of water in the range from 60° to 120°. Films having a contact angle of smaller than 60° are practically unacceptable in durability and corrosion resistance, and plasma-polymerized films having a contact angle of greater than 120° are difficult to produce as a hydrocarbon film and unnecessary for actual applications. The contact angle of a plasma-polymerized film with water may be empirically determined from the type and flow rate of gaseous reactant(s) and plasma polymerization conditions.

The topcoat may consist solely of the plasma-polymerized film. In the second embodiment, the topcoat may consist of the plasma-polymerized film and an organic coating applied thereon. Covering of the plasma-polymerized film with an organic coating offers further improvements in runnability and durability as well as jitter and envelope characteristics, dynamic friction, and dropouts after durability test runs. In this embodiment, the plasma-polymerized film also functions as a layer for anchoring the organic coating, also contributing to improvements in mechanical strength, durability, corrosion resistance, and stability.

The organic matter coating has a thickness of 10 to 50 Å, preferably 20 to 40 Å. Thickness of less than 10 Å are too thin to provide a satisfactory improvement in runnability or the like. Thiknesses of more than 50 Å increase the spacing loss, deteriorate durability, and detract from jitter and envelope characteristics, dynamic friction, and dropouts after durability test runs.

The organic coating may be applied by any desired coating techniques as will be described later. When a vapor phase grown film of organic compound is used instead of the coating, undesired increases are observed in dynamic friction and dropout after durability test runs.

The organic coating may preferably contain an organic fluorine compound. The preferred organic fluorine compounds are fluorine compounds containing a perfluoroalkyl radical having 2 to 20 carbon atoms. Examples of the perfluoroalkyl compounds are ethers, polyethers, thioethers, polythioethers, carboxylic acids and sulfonic acids and derivatives and salts, silicon compounds, and other polymers, all containing a perfluoroalkyl radical. They are described in the following patent literature.

| | | |
|---|---|---|
| 56-87236 | 57-44226 | 57-152543 |
| 57-191831 | 57-200940 | 57-200939 |
| 58-29147 | 58-73018 | 58-77032 |
| 59-9177 | 59-146442 | 60-61918 |
| 60-93634 | 60-93637 | 60-107732 |
| 60-109028 | 60-127519 | 60-140534 |
| 60-229221 | 61-57038 | 61-104318 |
| 61-104328 | 61-105723 | 61-107528 |
| 61-107529 | 61-113126 | 61-120331 |
| 61-120340 | 61-165821 | |
| 61-202330 | | |

The perfluoroalkyl compounds may be compounds of the radiation curable type containing an unsaturated bond and a perfluoroalkyl radical. The preferred perfluoroalkyl compounds containing an unsaturated bond are compounds containing a perfluoroalkyl radical and an unsaturated bond such as an acrylic or methacrylic radical as disclosed in Japanese Patent Application Kokai Nos. 60-229221, 61-122923, 61-211827, and 61-240430.

Mixtures of perfluoroalkyl compounds may also be used. These perfluoroalkyl compounds may form an organic coating as such or in combination with another component. In the latter case, the organic coating may preferably comprise at least 10% by weight, preferably at least 25% by weight of the perfluoroalkyl compound.

The organic coating used in the practice of the present invention may contain an additional radiation-curable compound other than the organic fluorine compound, the additional compound being radiation cured. Examples of the additional radiation-curable compounds include monomers, oligomers and polymers of the radiation-curable type. They are described in the following patent literature.

| 60-226016 | 60-231909 | 60-253019 |
| 60-254417 | 60-254418 | 60-258724 |
| 60-261020 | 61-911 | 61-912 |
| 61-8722 | 61-8729 | 61-8730 |
| 61-9820 | 61-11929 | 61-11930 |
| 61-13432 | 61-13438 | |

Among them, those containing a perfluoroalkyl radical are very effective.

The coating may be formed from the above-mentioned compounds by any conventional coating technique such as gravure coating, reverse roll coating, air knife coating, and air doctor coating. When a compound having an unsaturated bond is used, the coating is cured by exposing to radiation such as electron radiation produced by a radiation accelerator, gamma-rays emitted from a Co60 source, beta-rays emitted from a Sr90 source, x-rays produced by an x-ray generator, and ultraviolet radiation. The preferred dose is in the range of 0.1 to 20 Mrad.

The coating may further contain any desired additives selected from various well-known lubricants, antioxidants, and hardeners. Illustrative of the lubricants are those ordinally used in conventional magnetic recording media such as silicone fluid, fluorine oil, alcohols, fatty acids and their esters, paraffin, liquid paraffin, and surfactants. Radiation-curable compounds as disclosed in the patent publications listed above may also be used as the lubricant. Any desired ones of the antioxidants and hardeners disclosed in the patent publications listed above may also be used.

Any desired solvent may be used in coating, for example, ketone solvents such as methyl ethyl ketone, cyclohexanone, and methyl isobutyl ketone; alcohols such as isopropyl alcohol; aromatics such as toluene; halide solvents such as dichloroethene, etc. and mixtures thereof.

The magnetic recording medium of the present invention has a magnetic layer on a substrate. The substrates are not particularly limited as long as they are nonmagnetic. Particularly preferred are flexible substrates, especially of resins, for example, polyesters such as polyethylene terephthalate and polyimides. They are not limited in shape, size, and thickness as long as they meet the intended application. Preferably, the flexible substrates have a thickness of about 5 to 20 $\mu$m.

Any of various well-known backcoat layers may be formed on that surface of the substrate remote from the ferromagnetic metal thin film layer, as disclosed in Japanese Patent Application No. 61-221330.

The magnetic layer on the surface of which the plasma-polymerized film is formed is a continuous ferromagnetic metal thin film coextending over the substrate and is generally based on cobalt. In preferred embodiments of the present invention, the magnetic layer may consist essentially of cobalt; cobalt and oxygen; cobalt, oxygen and nickel and/or chromium. That is, the magnetic layer may consist essentially of cobalt alone or a mixture of cobalt with nickel and/or oxygen.

Where the layer consists essentially of cobalt and nickel, the weight ratio of Co/Ni may preferably be at least about 1.5.

Better results are obtained when the ferromagnetic metal thin film layer contains chromium in addition to cobalt; cobalt and nickel; cobalt and oxygen; or cobalt, nickel, and oxygen. The presence of chromium contributes to further improvements in electromagnetic characteristics, output level, signal-to-noise (S/N) ratio, and film strength. In this case, the weight ratio of Cr/Co (when nickel free) or Cr/(Co+Ni) is preferably in the range of about 0.001 to 0.1, and more preferably about 0.005 to 0.05.

The magnetic layer may further contain oxygen in addition to cobalt or cobalt and nickel. The presence of oxygen contributes to further improvements in electromagnetic characteristics and runnability. In this case, the atomic ratio of OCo (when nickel free) or O(Co+Ni) is preferably up to about 0.5, and more preferably from about 0.05 to 0.5.

On the surface of the ferromagnetic metal thin film layer, oxygen forms oxides with ferromagnetic metals Co and Ni. In Auger spectroscopy, peaks indicative of oxides appear in a surface layer, particularly in a surface layer from the exposed surface to a depth of 50 to 500 Å, more preferably 50 to 200 Å. This oxide layer has an oxygen content of the order of 0.5 to 1.0 in atomic ratio. No particular limit is imposed on the concentration gradient of oxygen in the ferromagnetic metal thin film layer.

The ferromagnetic metal thin film layer may further contain trace elements, particularly transition elements, for example, Fe, Mn, V, Zr, Nb, Ta, Ti Zn, Mo, W, Cu, etc. or C.

The ferromagnetic metal thin film layer preferably consists of a coalescence of Co base particles of columnar structure oriented oblique to the normal to the substrate. More specifically, the axis of particles of columnar structure is preferably oriented at an angle of about 10 to 70 degrees with respect to the normal to the major surface of the substrate. Each columnar particle generally extends throughout the thickness of the ferromagnetic metal thin film layer and has a breadth or minor diameter of the order of 50 to 500 angstroms. Cobalt and optional metals such as nickel and chromium form the columnar structure particles themselves while oxygen, when added, is generally present on the surface of each columnar structure particle in the surface layer essentially in the form of oxides. The ferromagnetic metal thin film layer generally has a thickness of about 0.05 to 0.5 $\mu$m, and preferably about 0.07 to 0.3 $\mu$m.

The magnetic layer is generally formed by the so-called oblique incidence evaporation process. The oblique incidence evaporation process may be any of well-known techniques preferably using an electron beam gun while the minimum incident angle with respect to the normal to the substrate is preferably 30 degrees. Evaporation conditions and post-treatments are well known in the art and any suitable ones may be selected therefrom. One effective post-treatment is a treatment for incorporating oxygen into the magnetic layer, which is also well known in the art. For further information about this evaporation process, reference should be made to D. E. Speliotis et al., "Hard magnetic films of iron, cobalt and nickel", *J. Apopl. Phys.*, 36, 3,972 (1965) and Y. Maezawa et al., "Metal thin film video tape by vacuum deposition", IERE Conference Proceedings 54 (The Fourth International Conference on Video and Data Recording, The University of Southanmpton, Hampshire, England, Apr. 20-23, 1982), pp. 1-9.

The ferromagnetic metal thin film layer may be formed on the substrate either directly or via an undercoat layer of the well-known type. Further, the ferromagnetic metal thin film layer is generally formed as a single layer, but in some cases, it may be made up from a plurality of laminated sub-layers with or without an intermediate nonferromagnetic metal thin film layer interposed therebetween.

Preferably, fine protrusions may be formed on the surface of the medium as disclosed in Japanese Patent Application No. 61-221330. Such protrusions may be developed by disposing fine particles on the substrate surface or applying a matting agent having fine particles incorporated therein to the substrate surface or incorporating fine particles in a substrate-forming resin composition.

The ferromagnetic metal thin film layer may be formed by any well-known techniques including electrodeposition, evaporation, ion plating, and metallizing, and more preferably by the so-called oblique incidence evaporation process. The oblique incidence evaporation process may be any of well-known techniques preferably using an electron beam gun while the minimum incident angle with respect to the normal to the substrate is preferably at least 20 degrees. Incident angles of less than 20 degrees result in deteriorated electromagnetic properties. The evaporation atmosphere may generally be an inert atmosphere of argon, helium or vacuum containing oxygen gas at a pressure of about $10^{-5}$ to 1 Pa. Those skilled in the art will readily select other evaporation parameters including source-substrate spacing, substrate feed direction, can and mask configurations and arrangement, and the like, through a simple experiment if necessary.

Evaporation in an oxygen-containing atmosphere causes a metal oxide film to form on the surface of the resulting magnetic layer. The partial pressure of oxygen gas necessary to allow for oxide formation may be readily determined through a simple experiment.

A metal oxide coating may be formed on the surface of the magnetic layer by an oxidizing treatment. Any of the following oxidizing treatments may be employed for this purpose.

(1) Dry treatment
(a) Energy particle treatment

Oxygen may be directed as energy particles to the magnetic layer at the final stage of evaporation process by means of an ion gun or neutron gun as described in Japanese Patent Application No. 58-76640.

(b) Glow treatment

The magnetic layer is exposed to a plasma which is created by generating a glow discharge in an atmosphere containing $O_2$, $H_2O$ or $O_2+H_2O$ in combination with an inert gas such as Ar and $N_2$.

(c) Oxidizing gas

An oxidizing gas such as ozone and steam is blown to the magnetic layer.

(d) Heat treatment

Oxidiation is effected by heating at temperatures of about 60° to 150° C.

(2) Wet Treatment
(a) Anodization
(b) Alkali treatment
(c) Acid treatment
  Chromate treatment, permanganate treatment, Phosphate treatment
(d) Oxidant treatment
  $H_2O_2$

BENEFITS OF THE INVENTION

According to the present invention, a plasma-polymerized film containing carbon and hydrogen in an atomic ratio of C/H from 1 to 6 and having a thickness of 3 to 15 Å and a contact angle with water of 60° to 120° is formed on a magnetic layer in the form of a ferromagnetic metal thin film under specific plasma polymerization conditions. The resulting magnetic recording medium is an improved high density magnetic recording medium operable with little spacing loss and having high corrosion resistance. The magnetic recording medium of the present invention is also characterized by a very high rupture strength.

Plasma polymerization, which is a gas phase reaction, provides a highly crosslinked thin film which appears to take a great role in improving rust prevention. Since plasma polymerization allows for continuous high-speed production, it can be readily incorporated in the current magnetic recording medium fabricating process or line without sacrificing production efficiency. The thin film produced by plasma polymerization is significantly improved in the above-mentioned surface properties without sacrificing the magnetic and electric properties and recording density of magnetic recording medium. This improvement is particularly significant as compared with the conventional thin film topcoats.

The medium is improved in dynamic friction, running stability, and durability. It is also improved in jitter and envelope characteristics, dropout, dynamic friction, and output even after durability test runs. These improvements are further enhanced by the provision of an organic coating.

EXAMPLES

Examples of the present invention are given below by way of illustration and not by way of limitation.

EXAMPLE 1

A polyethylene terephthalate (PET) web of 10 μm thick was moved along a cooling can in a vacuum vessel where a Co-Ni alloy was heated and evaporated by means of an electron beam gun while introducing oxygen. The Co-Ni alloy was vacuum deposited on the PET web. The background pressure in the vessel was set to $5\times10^{-5}$ Torr and the pressure was changed to $2\times10^{-4}$ Torr after introduction of $O_2$. The incident angle of deposition was continuously decreased from 90° to 30°. The deposited film had a composition of Co 80-Ni 20 on a weight basis and a thickness of about 1500 Å.

The magnetic layer-bearing web was then introduced into another vacuum chamber which was once evacuated to a vacuum of $10^{-3}$ Torr and then charged with the gaseous hydrocarbon shown in Table 1 as a monomeric reactant, in some cases, together with argon as a carrier gas in the volume ratio shown in Table 1. A plasma was generated in the gas under a gas pressure of 0.1 Torr by applying a high frequency voltage at 13.56 MHz and 500 watts. A plasma-polymerized film was formed on the magnetic layer in this manner.

The parameter W/F.M calculated from the polymerizing conditions is reported in Table 1 along with the thickness and C/H ratio of the film. It is to be noted that film thickness is measured by means of an ellipsometer while film thicknesses of less than 5 Å are calculated from the polymerizing time. Elemental analysis of a topcoat layer was made by SIMS while ion etching the topcoat layer with argon.

In this way, a series of topcoat layers were formed on the magnetic layer as shown in Table 1.

The samples were measured for various properties as shown below.

(1) Corrosion resistance ($\Delta\phi m/\phi m$)

A tape was measured for magnetic flux quantity both at the initial and after it was allowed to stand for 3 days at 60° C. and a relative humidity of 80%. A percent reduction in magnetic flux quantity ($\Delta\phi m/\phi m$, %) per square meter was determined.

(2) Rupture strength (RS)

The strength of a tape was measured at which it was broken by increasing a pulling force.

(3) Output reduction

A commercial VHS video deck was loaded and operated with a tape. Using a signal of 4 MHz, a reduction (dB) in output after 100 passes was determined.

(4) Dynamic friction ($\mu$)

An initial coefficient of friction was measured.

(5) Envelope characteristics

A durability test was made by operating a tape over 200 passes at 60° C. and RH 90%. The minimum envelope width is expressed in percent based on 100% of the maximum envelope width.

(6) Dropouts

After the same durability test as in (5), dropouts per minute was counted.

(7) Jitter

After the same durability test as in (5), jitter was measured in $\mu$sec. using a jitter meter.

EXAMPLE 2

The procedure of the Example 1 was repeated except that each of the following organic coatings A to H was subsequently applied to the plasma-polymerized film. The samples produced are reported in Table 2.

Organic coating A

| Ingredient | Parts by weight |
|---|---|
| $C_8F_{17}-C_2H_4-OCO-CH=CH_2$ | 0.3 |
| Butyl stearate | 0.3 |
| Cyclohexanone | 100 |

A mixture of the ingredients was milled, applied to the plasma-polymerized film, dried, and then exposed to electron radiation in nitrogen gas under operating conditions of 150 keV, 6 milliamperes, and 3 Mrad, obtaining an organic coating of 30 Å thick.

Organic coating B

The procedure of organic coating A was repeated, obtaining an organic coating of 5 Å thick.

Organic coating C

The procedure of organic coating A was repeated, obtaining an organic coating of 80 Å thick.

Organic coating D

The procedure of organic coating A was repeated except that the coating composition was replaced by the following one, obtaining an organic coating of 30 Å thick.

| Ingredient | Parts by weight |
|---|---|
| $C_8F_{17}-C_2H_4-OPO-(OC_2H_4OCOCH=CH_2)_2$ | 0.3 |
| Butyl myristate | 0.3 |
| Cyclohexanone | 100 |

TABLE 1

| | | | Plasma-polymerized film | | | | | | | | Durability test | | |
|---|---|---|---|---|---|---|---|---|---|---|---|---|---|
| Sample No. | Monomer | W/F.M (joule/kg) | Carrier/monomer ratio | Thickness (Å) | C/H | Contact angle (°) | $\Delta\phi m/\phi m$ (%) | RS (kg/mm$^2$) | Output (dB) | Initial $\mu$ | Jitter ($\mu$sec) | Dropout (/min.) | Envelope (%) |
| 1 | CH$_4$ | 5 × 10$^8$ | 0 | 4 | 2.6 | 85 | 15 | 4.2 | −0.5 | 0.35 | 0.20 | 30 | 85 |
| 2 | CH$_4$ | 5 × 10$^8$ | 0 | 6 | 2.6 | 85 | 15 | 4.1 | −0.5 | 0.34 | 0.19 | 35 | 85 |
| 3 | CH$_4$ | 5 × 10$^8$ | 0 | 8 | 2.6 | 86 | 15 | 4.2 | −0.5 | 0.35 | 0.21 | 30 | 80 |
| 4 | CH$_4$ | 5 × 10$^8$ | 0 | 10 | 2.6 | 85 | 14 | 4.3 | −1.0 | 0.36 | 0.25 | 40 | 75 |
| 5 | CH$_4$ | 5 × 10$^8$ | 0 | 12 | 2.7 | 85 | 14 | 4.2 | −1.5 | 0.38 | 0.25 | 45 | 70 |
| 6 | CH$_4$ | 5 × 10$^8$ | 0 | 15 | 2.6 | 86 | 14 | 4.2 | −2.0 | 0.39 | 0.27 | 50 | 70 |
| 7* | CH$_4$ | 5 × 10$^8$ | 0 | 25 | 2.6 | 85 | 14 | 4.2 | −2.5 | 0.41 | 0.28 | 80 | 65 |
| 8* | CH$_4$ | 5 × 10$^8$ | 0 | 40 | 2.6 | 85 | 13 | 4.3 | −2.0 | 0.40 | 0.30 | 80 | 65 |
| 9* | CH$_4$ | 5 × 10$^8$ | 0 | 60 | 2.6 | 85 | 13 | 4.4 | −2.0 | 0.41 | 0.29 | 85 | 60 |
| 10* | CH$_4$ | 5 × 10$^8$ | 0 | 300 | 2.6 | 86 | 12 | 4.6 | −4.0 | 0.42 | 0.30 | 100 | 35 |
| 11* | CH$_4$ | 2 × 10$^5$ | 0 | 6 | 0.6 | 75 | 28 | 2.6 | −5.5 | 0.45 | 0.45 | 350 | 40 |
| 12* | CH$_4$ | 8 × 10$^7$ | 0 | 6 | 1.9 | 80 | 21 | 2.9 | −2.0 | 0.43 | 0.39 | 70 | 45 |
| 13* | CH$_4$ | 2 × 10$^{10}$ | 0 | 6 | 3.1 | 90 | 23 | 3.1 | −2.5 | 0.40 | 0.38 | 30 | 55 |
| 14* | CH$_4$ | 5 × 10$^{13}$ | 0 | 6 | 6.2 | 55 | 36 | 2.4 | −9.0 | 0.55 | 0.40 | 35 | 50 |
| 15 | CH$_4$ | 2 × 10$^8$ | 0 | 6 | 2.7 | 87 | 15 | 4.1 | −0.5 | 0.35 | 0.21 | 30 | 50 |
| 16 | C$_2$H$_6$ | 7 × 10$^9$ | 0 | 6 | 2.6 | 82 | 14 | 3.9 | −1.0 | 0.34 | 0.19 | 35 | 85 |
| 17* | — | — | — | — | — | — | 40 | 2.5 | −10.0 | 0.60 | 0.80 | 850 | 30 |
| 18 | CH$_4$ | 5 × 10$^8$ | 0.05 | 6 | 2.1 | 85 | 14 | 4.1 | −1.5 | 0.35 | 0.25 | 60 | 75 |
| 19 | CH$_4$ | 5 × 10$^8$ | 1 | 6 | 2.0 | 83 | 17 | 4.0 | −1.7 | 0.37 | 0.30 | 65 | 70 |
| 20 | CH$_4$ | 5 × 10$^8$ | 1 | 10 | 2.0 | 82 | 15 | 4.2 | −1.7 | 0.38 | 0.35 | 70 | 70 |
| 21* | CH$_4$ | 5 × 10$^8$ | 1 | 25 | 2.2 | 85 | 18 | 3.9 | −2.9 | 0.43 | 0.38 | 150 | 60 |
| 22* | CH$_4$ | 5 × 10$^8$ | 1.1 | 6 | 1.8 | 63 | 20 | 3.5 | −2.5 | 0.45 | 0.40 | 190 | 60 |
| 23* | CH$_4$ | 5 × 10$^8$ | 1.5 | 6 | 1.6 | 58 | 21 | 3.1 | −2.8 | 0.48 | 0.42 | 250 | 55 |
| 24* | CH$_4$ | 5 × 10$^8$ | 1 | 60 | 2.2 | 84 | 16 | 4.2 | −8.0 | 0.35 | 0.40 | 150 | 50 |

*Comparison

Organic coating E

A composition of the following ingredients was applied and dried into an organic coating of 30 Å thick.

| Ingredient | Parts by weight |
|---|---|
| Perfluorooctyl carboxylic acid | 0.5 |
| Butyl stearate | 0.5 |
| Cyclohexanone | 100 |

Organic coating F

A composition of the following ingredients was applied and dried into an organic coating of 30 Å thick.

| Ingredient | Parts by weight |
|---|---|
| Carboxyl-containing perfluoroalkyl polyether (KRYTOX ® 157FS, E.I. duPont) | 0.5 |
| Butyl stearate | 0.5 |
| Cyclohexanone | 100 |

Organic coating G

Perfluorooctyl carboxylic acid was vacuum deposited under a pressure of $10^{-2}$ Pa, obtaining an organic film of 30 Å thick.

Organic coating H

The solids of KRYTOX 157FS was vacuum deposited under a pressure of $10^{-2}$ Pa, obtaining an organic film of 30 Å thick.

The samples shown in Table 2 were measured for property (8) as well as properties (1) to (7) described in Example 1.

(8) Dynamic friction after durability test runs ($\mu$)

A sample was operated over 300 passes at 0° C. before the dynamic friction was measured.

We claim:

1. In a magnetic recording medium comprising a substrate, a ferromagnetic metal thin film formed on the substrate, and a topcoat formed on the thin film,
   the improvement wherein the topcoat is comprised of a plasma-polymerized film prepared by activating a gaseous hydrocarbon monomer optionally containing an amount of a carrier gas to give a volume ratio of carrier to monomer of up to 1 into a plasma with the parameter W/F.M set to $10^8$ to $10^{10}$ joule/kg where W is an input power applied for plasma generation in joule/sec., F is a flow rate of the monomer in kg/sec., and M is the molecular weight of the monomer,
   whereby said plasma-polymerized film consists essentially of carbon and hydrogen in an atomic ratio of carbon to hydrogen of from 1:1 to 6:1 and has a thickness of 3 to 15 angstroms and a contact angle with water in the range from 60° to 120°.

2. The magnetic recording medium of claim 1 wherein the plasma-polymerized film has a thickness of 3 to 8 angstroms.

3. The magnetic recording medium of claim 1 wherein the plasma-polymerized film is prepared by activating essentially a gaseous hydrocarbon monomer alone into a plasma.

4. The magnetic recording medium of claim 1 wherein the ferromagnetic metal thin film is a vapor deposited cobalt base film.

5. The magnetic recording medium of claim 4 wherein the ferromagnetic metal thin film contains oxygen.

6. In a magnetic recording medium comprising a substrate, a ferromagnetic metal thin film formed on the substrate, and a topcoat formed on the thin film,
   the improvement wherein the topcoat comprises a plasma-polymerized film and an organic coating applied thereon,

TABLE 2

| Sample No. | Plasma-polymerized film Monomer | W/F.M (joule/kg) | Carrier/ monomer ratio | Thickness Å | C/H | Contact angle (°) | Organic coating (thick, Å) | $\Delta\phi m/\phi m$ (%) | RS (kg/mm$^2$) | Output (dB) | Initial $\mu$ | Jitter ($\mu$sec) | Durability test Dropout (/min.) | $\mu$ after 300 passes | Envelope (%) |
|---|---|---|---|---|---|---|---|---|---|---|---|---|---|---|---|
| 31 | CH$_4$ | 5 × 10$^8$ | 0 | 4 | 2.6 | 85 | A(30) | 15 | 4.2 | −0.5 | 0.15 | 0.08 | 20 | 0.20 | 95 |
| 32 | CH$_4$ | 5 × 10$^8$ | 0 | 6 | 2.6 | 85 | A(30) | 15 | 4.1 | −0.5 | 0.16 | 0.09 | 20 | 0.22 | 95 |
| 33 | CH$_4$ | 5 × 10$^8$ | 0 | 8 | 2.6 | 86 | A(30) | 15 | 4.2 | −0.5 | 0.14 | 0.09 | 22 | 0.19 | 95 |
| 34 | CH$_4$ | 5 × 10$^8$ | 0 | 10 | 2.6 | 85 | A(30) | 14 | 4.3 | −1.0 | 0.17 | 0.18 | 35 | 0.29 | 85 |
| 35* | CH$_4$ | 5 × 10$^8$ | 0 | 25 | 2.6 | 85 | A(30) | 14 | 3.9 | −1.5 | 0.18 | 0.22 | 55 | 0.60 | 75 |
| 36* | CH$_4$ | 5 × 10$^8$ | 0 | 60 | 2.6 | 85 | A(30) | 13 | 4.4 | −2.0 | 0.20 | 0.23 | 60 | 0.65 | 70 |
| 37* | CH$_4$ | 5 × 10$^8$ | 0 | 300 | 2.6 | 86 | A(30) | 12 | 4.6 | −4.0 | 0.15 | 0.26 | 85 | 0.80 | 45 |
| 38 | CH$_4$ | 2 × 10$^8$ | 0 | 6 | 2.7 | 87 | A(30) | 15 | 4.1 | −0.5 | 0.14 | 0.10 | 25 | 0.24 | 95 |
| 39 | C$_2$H$_6$ | 7 × 10$^9$ | 0 | 6 | 2.6 | 82 | A(30) | 14 | 3.9 | −1.0 | 0.14 | 0.10 | 25 | 0.25 | 90 |
| 40* | CH$_4$ | 5 × 10$^8$ | 0 | 2 | 2.1 | 85 | A(30) | 29 | 3.1 | −0.5 | 0.15 | 0.25 | 45 | 0.55 | 80 |
| 41* | CH$_4$ | 2 × 10$^5$ | 0 | 6 | 0.6 | 75 | A(30) | 28 | 2.6 | −5.5 | 0.14 | 0.35 | 250 | 1.3 | 50 |
| 42* | — | — | 0 | — | — | — | A(30) | 40 | 2.5 | −10.0 | 0.14 | 0.60 | 400 | 1.5 | 45 |
| 43* | CH$_4$ | 8 × 10$^7$ | 0 | 6 | 1.9 | 80 | A(30) | 21 | 2.9 | −2.0 | 0.17 | 0.30 | 55 | 0.80 | 55 |
| 44* | CH$_4$ | 2 × 10$^{10}$ | 0 | 6 | 3.1 | 90 | A(30) | 23 | 3.1 | −2.5 | 0.19 | 0.26 | 25 | 0.60 | 60 |
| 45* | CH$_4$ | 5 × 10$^{13}$ | 0 | 6 | 6.2 | 55 | A(30) | 36 | 2.4 | −9.0 | 0.22 | 0.29 | 30 | 1.6 | 55 |
| 46 | CH$_4$ | 5 × 10$^8$ | 0.05 | 6 | 2.1 | 85 | A(30) | 14 | 4.1 | −1.5 | 0.16 | 0.18 | 40 | 0.40 | 85 |
| 47 | CH$_4$ | 5 × 10$^8$ | 1 | 6 | 2.0 | 83 | A(30) | 17 | 4.0 | −1.7 | 0.17 | 0.25 | 60 | 0.60 | 75 |
| 48* | CH$_4$ | 5 × 10$^8$ | 1.1 | 6 | 1.8 | 63 | A(30) | 20 | 3.5 | −1.8 | 0.18 | 0.32 | 130 | 0.80 | 75 |
| 49* | CH$_4$ | 5 × 10$^8$ | 1.5 | 6 | 1.6 | 58 | A(30) | 21 | 3.1 | −2.0 | 0.18 | 0.36 | 180 | 1.0 | 70 |
| 50 | CH$_4$ | 5 × 10$^8$ | 0 | 6 | 2.6 | 85 | B(5) | 15 | 4.1 | −0.5 | 0.30 | 0.25 | 30 | 0.50 | 70 |
| 51 | CH$_4$ | 5 × 10$^8$ | 0 | 6 | 2.6 | 85 | C(80) | 15 | 4.1 | −0.5 | 0.20 | 0.36 | 250 | 0.35 | 70 |
| 52 | CH$_4$ | 5 × 10$^8$ | 0 | 6 | 2.6 | 85 | D(30) | 15 | 4.1 | −0.5 | 0.15 | 0.10 | 30 | 0.25 | 95 |
| 53 | CH$_4$ | 5 × 10$^8$ | 0 | 6 | 2.6 | 85 | E(30) | 15 | 4.1 | −0.5 | 0.15 | 0.13 | 30 | 0.23 | 90 |
| 54 | CH$_4$ | 5 × 10$^8$ | 0 | 6 | 2.6 | 85 | T(30) | 15 | 4.1 | −0.5 | 0.16 | 0.14 | 25 | 0.20 | 95 |
| 55 | CH$_4$ | 5 × 10$^8$ | 0 | 6 | 2.6 | 85 | G(30) | 15 | 4.1 | −0.5 | 0.14 | 0.19 | 90 | 0.95 | 85 |
| 56 | CH$_4$ | 5 × 10$^8$ | 0 | 6 | 2.6 | 85 | H(30) | 15 | 4.1 | −0.5 | 0.15 | 0.20 | 95 | 1.00 | 85 |

*Comparison said plasma-polymerized film being prepared by activating a gaseous hydrocarbon monomer optionally containing an amount of a carrier gas to give a volume ratio of carrier to monomer of up to 1 into a plasma with the parameter W/F.M set to $10^8$ to $10^{10}$ joule/kg where W is an input power applied for plasma generation in joule/sec., F is a flow rate of the monomer in kg/sec., and M is the molecular weight of the monomer, whereby said plasma-polymerized film consists essentially of carbon and hydrogen in an atomic ratio of carbon to hydrogen of from 1:1 to 6:1 and has a thickness of 3 to 15 angstroms and a contact angle with water in the range from 60° to 120°.

7. The magnetic recording medium of claim 6 wherein said organic coating has a thickness of 10 to 50 angstroms.

8. The magnetic recording medium of claim 7 wherein said organic coating comprises an organic fluorine compound.

9. The magnetic recording medium of claim 8 wherein said organic fluorine compound contains a perfluoroalkyl radical.

10. The magnetic recording medium of claim 7 wherein said organic coating is a coating of an organic fluorine compound having an unsaturated bond, said coating being radiation cured.

11. The magnetic recording medium of claim 10 wherein said organic fluorine compound having an unsaturated bond contains a perfluoroalkyl radical and an acrylic or methacrylic radical.

12. The magnetic recording medium of claim 6 wherein the plasma-polymerized film has a thickness of 3 to 8 angstroms.

13. The magnetic recording medium of claim 6 wherein the plasma-polymerized film is prepared by activating essentially a gaseous hydrocarbon monomer alone into a plasma.

14. The magnetic recording medium of claim 6 wherein the ferromagnetic metal thin film is a vapor deposited cobalt base film.

15. The magnetic recording medium of claim 14 wherein the ferromagnetic metal thin film contains oxygen.

16. The magnetic recording medium according to claim 1, wherein said topcoat is formed directly on said thin film.

17. The magnetic recording medium according to claim 6, wherein the plasma-polymerized film of said topcoat is formed directly on said thin film.

* * * * *